US008935035B1

(12) United States Patent
Bogdanowicz et al.

(10) Patent No.: US 8,935,035 B1
(45) Date of Patent: Jan. 13, 2015

(54) ADVANCED OPTIMIZATION FRAMEWORK FOR AIR-GROUND PERSISTENT SURVEILLANCE USING UNMANNED VEHICLES

(75) Inventors: Zbigniew Bogdanowicz, Morganville, NJ (US); George Herc, Randolph, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/332,493

(22) Filed: Dec. 21, 2011

Related U.S. Application Data

(60) Provisional application No. 61/470,017, filed on Mar. 31, 2011.

(51) Int. Cl.

| | |
|---|---|
| ***G05D 1/12*** | (2006.01) |
| ***G05D 1/00*** | (2006.01) |
| ***B64C 19/00*** | (2006.01) |
| ***G08G 1/00*** | (2006.01) |
| ***G08G 5/00*** | (2006.01) |

(52) U.S. Cl.
CPC ... *G08G 1/00* (2013.01); *G08G 5/00* (2013.01)
USPC ............................................................ 701/26

(58) Field of Classification Search
None
See application file for complete search history.

(56) References Cited

U.S. PATENT DOCUMENTS

| | | | | |
|---|---|---|---|---|
| 8,234,067 | B2 * | 7/2012 | Bauer et al. | 701/467 |
| 2004/0030571 | A1 * | 2/2004 | Solomon | 705/1 |
| 2004/0134336 | A1 * | 7/2004 | Solomon | 89/1.11 |
| 2009/0219393 | A1 * | 9/2009 | Vian et al. | 348/144 |
| 2010/0163621 | A1 * | 7/2010 | Ben-Asher et al. | 235/412 |
| 2010/0286824 | A1 * | 11/2010 | Solomon | 700/248 |
| 2012/0290152 | A1 * | 11/2012 | Cheung et al. | 701/2 |

* cited by examiner

*Primary Examiner* — Helal A Algahaim
*Assistant Examiner* — Paul Castro
(74) *Attorney, Agent, or Firm* — Henry S. Goldfine

(57) ABSTRACT

An optimization framework for air and ground based persistent surveillance using unmanned vehicles. The objective of the optimization framework is to maximize the coverage of a target area for given UVs, skeleton, and maintenance sites. The optimization framework is based on the generation of mini-cycles, and assigning them in a fractional manner to the given UVs. Subsequently, the optimization framework based on UV-Cross and UV-k-Swap transformations, followed by the cycle of fusion, integerization, and schedule synchronization.

11 Claims, 9 Drawing Sheets

200

ADVANCED OPTIMIZATION FRAMEWORK FOR AIR-GROUND PERSISTENT SURVEILLANCE USING UNMANNED VEHICLES

CROSS-REFERENCE TO RELATED APPLICATIONS

This application claims the benefit under 35 USC §119(e) of U.S. Provisional Patent Application No. 61/470,017, filed on Mar. 31, 2011, which is incorporated by reference in its entirety.

GOVERNMENTAL INTEREST

The invention described herein may be manufactured and used by, or for the Government of the United States for governmental purposes without the payment of any royalties thereon.

FIELD OF THE INVENTION

The present invention relates in general to the field of persistent surveillance. Particularly, this invention relates to an advanced optimization framework for loitering, having military and commercial applications. More specifically, this invention relates to the optimization of air-ground persistent surveillance using unmanned vehicles.

BACKGROUND OF THE INVENTION

Unmanned vehicles (UVs), including unmanned aerial vehicles (UAVs) and ground vehicles (UGVs) are increasingly becoming more sophisticated and reliable for various military operations. They are also becoming smaller and less costly to produce. While many missions were already carried out with UAVs and/or UGVs, they were usually focused on a single UV at a time.

The affordability of concurrently deploying a fleet (e.g., tens or hundreds) of UVs is expected to be achieved in the near future. However, an important aspect of such realization relies heavily on the collaborative operation between the deployed UVs, particularly on the battlefields.

One such obvious collaborative operation of UVs is focused on persistent surveillance. It is projected that in the future, persistent surveillance by UVs will play a critical role in eliminating human casualties while simultaneously enhancing the quality of such operations.

As a result, it would be desirable to optimize the fleet of UVs for loitering patterns as well as for their maintenance scheduling, in order to maximize coverage of the given area of surveillance, by minimizing unnecessary overlaps. In other terms, for a given fleet of UVs with different mission payloads and characteristics, specified areas of interest, and a given set of maintenance sites, it would be desirable to find an optimum set of loitering routes along with the optimal maintenance schedule that maximizes coverage (i.e., minimizes the surveillance overlap).

UV maintenance also represents a concern for the operation. Typically, a UV needs to be recharged or refueled within a few hours, although there exists UVs that can operate for a much longer time. This means that typically after one or two hours of loitering, a given UV must land at a designated maintenance point to refuel or recharge. Although for a UGV, the refueling time might somewhat be greater on the average than that of an UAV, the underlying principle remains the same for these UVs.

What is therefore needed is an advanced optimization framework for air-ground persistent surveillance using unmanned vehicles. Prior to the advent of the present invention, the need for such an optimization framework has heretofore remained unsatisfied.

SUMMARY OF THE INVENTION

The present invention satisfies this need, and describes an advanced optimization framework for air and ground persistent surveillance (or loitering) using unmanned vehicles (UVs). The optimization framework has numerous military and commercial applications.

The optimization framework is based on mini-cycles (MCs) and includes the following main steps:

At the first step, the optimization framework generates mini-cycles (i.e., "shortest" cycles), which cover all the flying legs for a target coverage area.

At the second step, the optimization framework assigns portions of given or predetermined UVs (UAVs, UGVs, or a combination thereof) to mini-cycles.

At the third step, the optimization framework optimizes the loitering schedule by converting mini-cycles and "derived" cycles with assigned UVs into new "derived" cycles, with assigned UVs using the following two types of transformations of loitering pattern: UV-Cross transformation; and UV-k-Swap transformation.

As used herein, UV-Cross transformation implies the same type (or types) of UAVs or UGVs are being assigned to both cycles. The optimization framework applies cross to split derived cycles into more smaller cycles. UV-k-Swap transformation might involve two or more cycles crossing each other and different types of UAVs or UGVs. However, the UV-k-Swap transformation can be performed separately either on UAVs or UGVs. In other terms, preferably, the UV-k-Swap transformation is not performed on a combination of different UVs, such as UAVs and UGVs, because they are two different types of UVs.

At the fourth step, the optimization framework fuses the derived cycles.

At the fifth step, the optimization framework integerizes a practical, realistic solution.

At the sixth step, the optimization framework synchronizes the schedule of the UVs in order to maximize the coverage.

BRIEF DESCRIPTION OF THE DRAWINGS

The above and other features of the present invention and the manner of attaining them, will become apparent, and the invention itself will be best understood, by reference to the following description and the accompanying drawings, wherein.

Similar numerals refer to similar elements in the drawings.

DETAILED DESCRIPTION OF PREFERRED EMBODIMENTS

Figure 1:
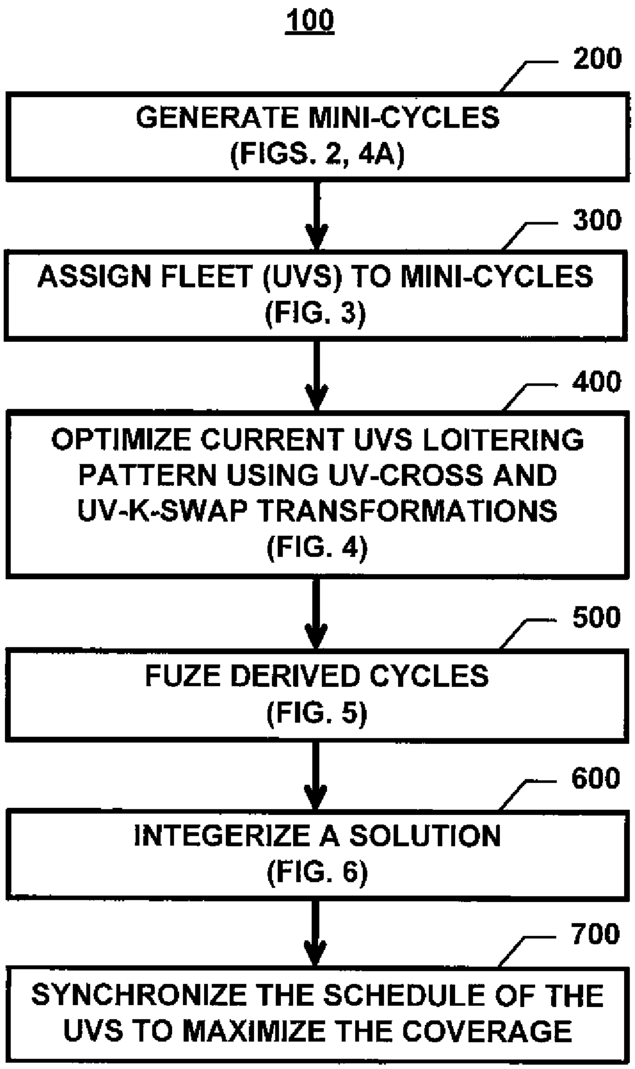
FIG. 1 is a flow chart that illustrates an optimization framework or process for maximizing air and ground persistent surveillance using unmanned vehicles, according to the present invention.

FIG. 1 illustrates an optimization framework or process 100 for maximizing air and/or ground persistent surveillance using unmanned vehicles (UVs), according to the present invention.

The optimization framework 100 generally includes the following main steps:

At step 220, the optimization framework 100 generates mini-cycles (MCs) from a given skeleton, as it will be explained later in connection with FIGS. 2 and 4A. Theses MCs cover all the flying legs (or links) for a target coverage area.

At step 300, the optimization framework 100 assigns portions of given UVs (UAVs, UGVs, or a combination thereof) to the MCs that are defined at step 220, as it will be explained later in connection with FIG. 3.

At step 400, and as it will be explained later in connection with FIG. 4, the optimization framework 100 optimizes the loitering schedule of the MCs that have been assigned at step 300, by converting the MCs and the "derived" cycles with assigned UVs, into new "derived" cycles with assigned UVs, using the following two types of transformations of loitering pattern: UV-Cross transformation; and UV-k-Swap transformation.

As used herein, UV-Cross transformation implies the same type (or types) of UAVs or UGVs are being assigned to both cycles. The optimization framework applies cross to split derived cycles into more smaller cycles. UV-k-Swap transformation might involve two or more cycles crossing each other and different types of UAVs or UGVs. However, the UV-k-Swap transformation has to be performed separately either on UAVs or UGVs. In other terms, preferably, the UV-k-Swap transformation is not performed on a combination of different UVs, such as UAVs and UGVs, because they are two different types of UVs.

At step 500, the optimization framework 100 fuses the derived cycles, resulting from step 400.

At step 600 and as it will be explained later in connection with FIG. 6, the optimization framework 100 integerizes a practical, realistic solution for the fuzed derived cycles (step 500).

At step 700, the optimization framework 100 synchronizes the schedule of the UVs that are assigned to the fuzed derived cycles (FIG. 6) in order to maximize the coverage of the target area of interest.

Figure 2:
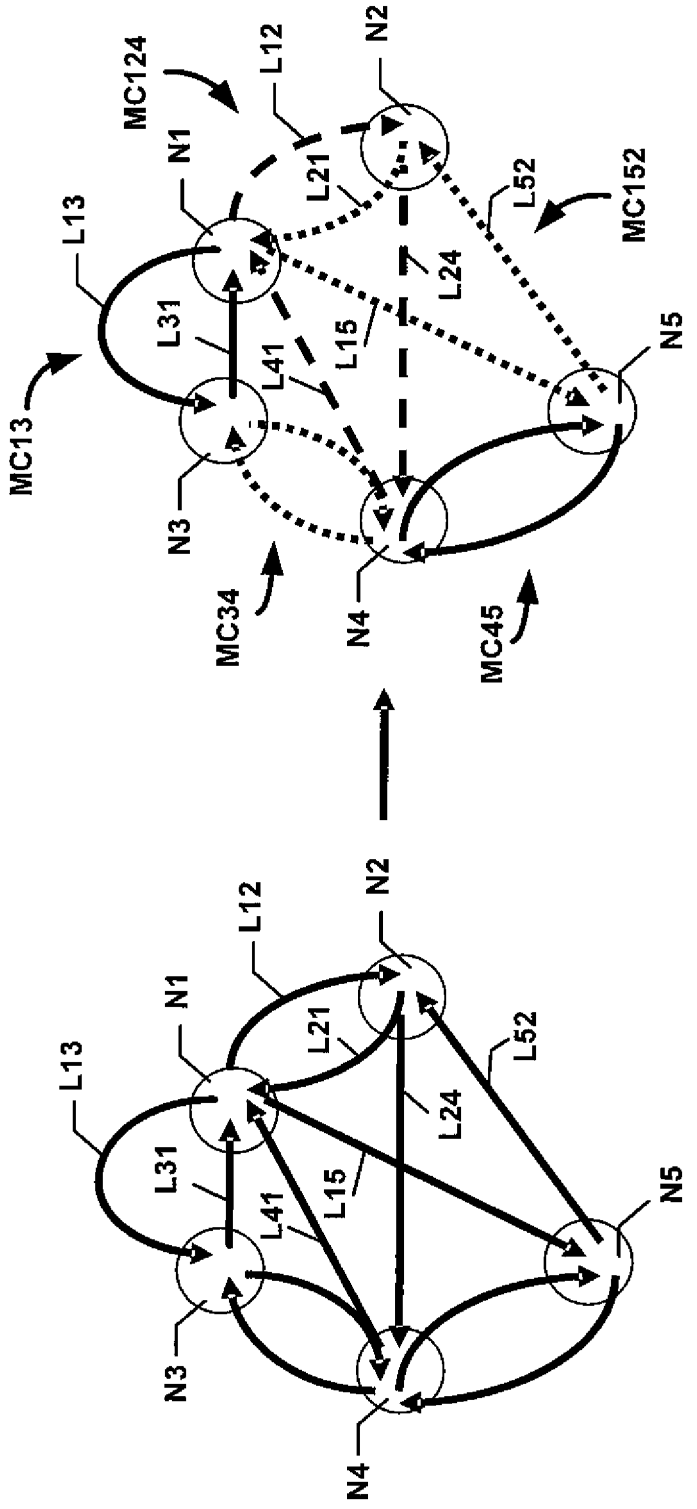
FIG. 2 illustrates the step of generating mini-cycles (MCs) by the optimization framework of FIG. 1.

With reference to FIG. 2, it illustrates step 200 of the optimization framework 100, and represents the core input for the optimization framework 100. The core input includes: A skeleton and at least two UVs, where each UV is either a UAV or a UGV.

In this exemplary illustration, the skeleton is formed of five nodes (or waypoints) N1, N2, N3, N4, N5 that are interconnected by a plurality of links (or directed legs) L12, L21, L13, L31, etc., that characterize the loitering patterns of UVs (UAVs and/or UGVs). In addition, the lengths of these links legs are predetermined, and correspond to the distances between the nodes.

In this illustration, each node is represented by a circle (e.g., N1). The number of input arrows (e.g., L21, L31, L41) to the node N1 equals the number of output arrows (e.g., L13, L12, L15) from the node N1. To each leg of the skeleton that interconnects two nodes, there corresponds a number, which determines a distance between the two nodes.

The skeleton can be modeled with a balanced multidigraph G=(V,A) with V(G) vertices and A(G) arcs, coupled with the distance matrix D. There are two types of vertices; (1) vertices corresponding to UAVs, and (2) vertices corresponding to UGVs. An arc connects two vertices only if both vertices are of the same type. Let $d_i^+(G)$ be in-degree of vertex $v_i \epsilon V(G)$. Similarly, let $d_i^-(G)$ be out-degree of vertex $v_i \epsilon\ V(G)$. The multidigraph G is said to be balanced if $d_i^+(G)=d_i^-(G)$ for every vertex $v_i$ in G. A multidigraph that models a skeleton is a balanced multidigraph. It is also assumed that to every arc $a_i \epsilon A(G)$ there corresponds a distance $d_i \epsilon D$.

For clarity of illustration, the cycles in the left skeleton will be illustrated with different lines in the right skeleton, wherein five mini-cycles (MC13, MC124, MC152, MC45, MC34)) are generated from the nodes and links. As an example, the first mini-cycle MC13 is illustrated with solid lines and includes two links L13, L31 and two nodes N1, N3. The second mini-cycle MC124 is illustrated with dashed lines and includes three links L12, L24, L41 and three nodes N1, N2, N4. The third mini-cycle MC152 is illustrated with dotted lines and includes three links L15, L52, L21 and three nodes N1, N5, N2. It should be clear that a different number of MCs can be generated.

This step 200 of the optimization framework 100 can be further described stated as follows. For given UVs, balanced multidigraph G, and the corresponding distance matrix D, it is desired to assign UVs to induced cycles by G in such a way that the given objective function is optimized. There are two exemplary, possible scenarios for consideration. In the first scenario the given UVs cannot cover the given area of interest due to its size. In this case the objective of optimization is focused on the maximizing the coverage of the given area of interest by UVs, or alternatively minimizing the overlap of assigned UVs.

In the second scenario the given UVs can cover the given area of interest. In this case the objective of optimization is focused on the minimization of the number of UVs needed to be assigned. This second scenario, however, can be easily translated into the first scenario. For example, it is possible to apply a greedy algorithm by decreasing the number of the UVs by one at a time, to check if the area of interest is completely covered by the new set of UVs, and to repeat these steps until the number of UVs becomes insufficient. The focus then shift on optimizing the first scenario.

The fact that surveillance is persistent implies that each UV will move over some directed cycle, and eventually return to its starting point, which can be assumed to correspond to a maintenance site. As a result, an important step of the optimization framework 100 involves the generations of mini-cycles from the given skeleton.

The mini-cycles induced by a given skeleton are the cycles of the shortest lengths, which cover all the legs of the skeleton. From the Graph Theory results it is known that for a given balanced multidigraph G such mini-cycles can be created. The challenge, however, lies in the generation of such mini-cycles.

One way to generate the MCs is based on a greedy algorithm by generating a shortest cycle in the current iteration through the shortest-path algorithm, such as Dijkstra's or Bellman-Ford. Reference is made to: R. Bellman, "On a routing problem," Quart. Appl. Math. 16(1) (1958), 87-90; M.

A. Goodrich, et al., "Supporting wilderness search and rescue using a camera-equipped mini UAV: research articles," Journal of Field Robotics 25(1-2) (2008), 89-110; and I. K. Nikolos, et al. "Evolutionary algorithm based offline/online path planner for UAV navigation," IEEE Transactions on Systems, Man, and Cybernetics-Part B: Cybernetics 33(6) (2003), 898-912.

It should be noted that the cycle generation is driven by the legs assigned to UAVs as opposed to UGVs. That is, in this example only, the optimization framework 100 does not generate a heterogeneous cycle consisting concurrently of links assigned to UAVs and UGVs.

Figure 3:
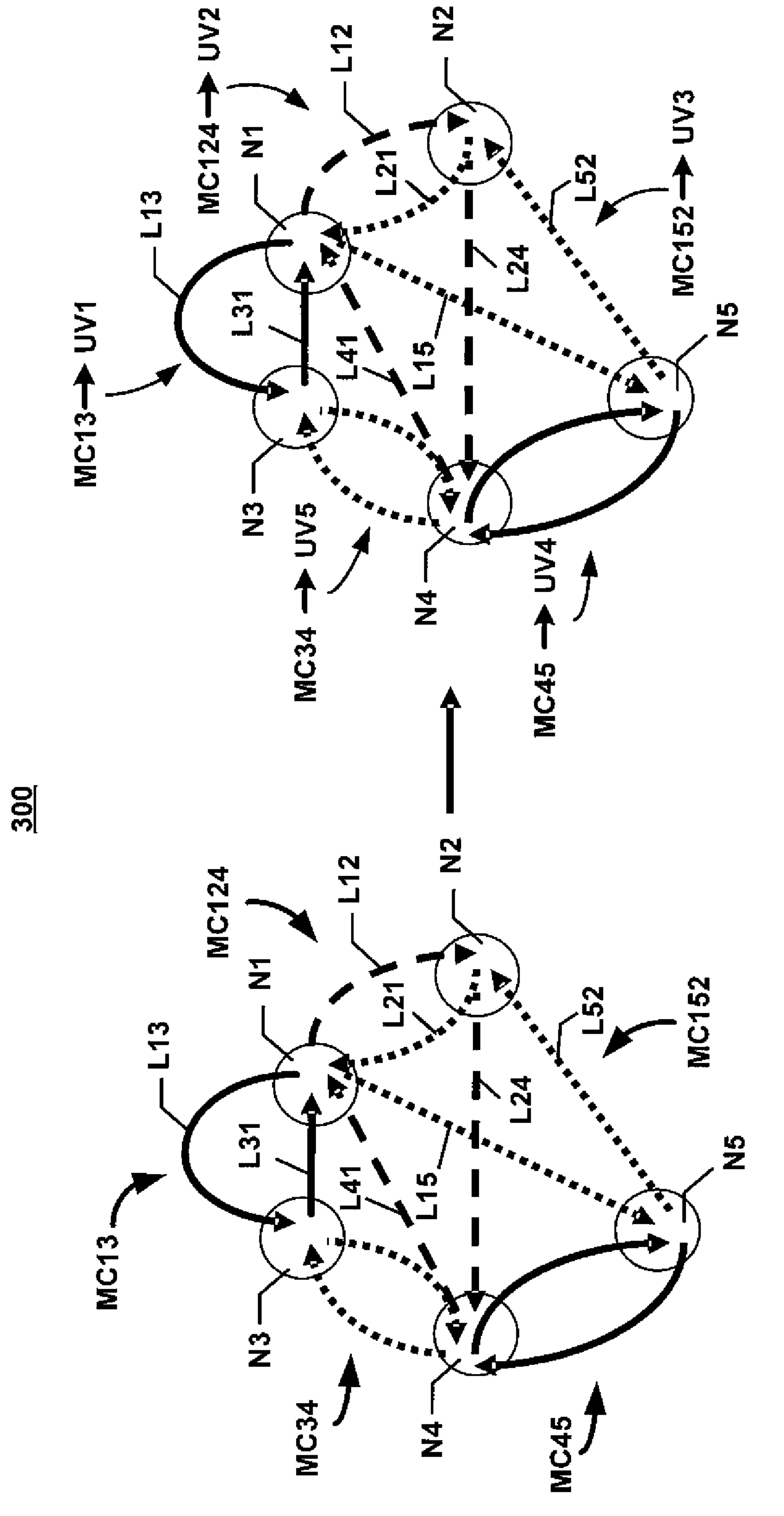
FIG. 3 illustrates the step of assigning given UVs to mini-cycles by the optimization framework of FIG. 1.

With reference to FIG. 3, the optimization framework 100 assigns given UVs to the mini-cycles that have been generated at the previous step 200. Once the mini-cycles are generated another challenge lies in assigning the given UVs to these mini-cycles. Reference is made to R. Beard, et al., "Autonomous vehicle technologies for small fixedwing UAVs," AIAA Journal of Aerospace Computing, Information, and Communication 2(1) (2005), 92-108; and E. W. Dijkstra, "A note on two problems in connection with graphs," Numer. Math. 1 (1959), 269-271.

Typically, the number of mini-cycles for a complex loitering pattern is much larger than the number of UVs. So, real numbers, ris, (i.e., fractions) corresponding to UVs will be assigned to mini-cycles. The mathematical formulation will use the distance times, ri, to capture the maximum coverage. Consequently, the optimization based on the UV-k-Swaps (to be described later in connection with FIG. 4) will also utilize ris.

Assuming for the sake of illustration only, that unmanned vehicle UV1 is assigned to mini-cycle MC13; unmanned vehicle UV2 is assigned to mini-cycle MC124; unmanned vehicle UV3 is assigned to mini-cycle MC152; unmanned vehicle UV4 is assigned to mini-cycle MC45; and unmanned vehicle UV5 is assigned to mini-cycle MC34. It should be clear that the same UVs can be used for different MCs. For example, UV1 can be the same unmanned vehicle as UV4.

Referring now to FIG. 4, it illustrates step 400 of the optimization framework 100, for optimizing the loitering pattern using UV-Cross and UV-k-Swap transformations. The basic operation that can, for example, be employed for optimization is based on the "cross" transformation, which is referred to herein as "UV-Cross transformation".

Figure 4A:
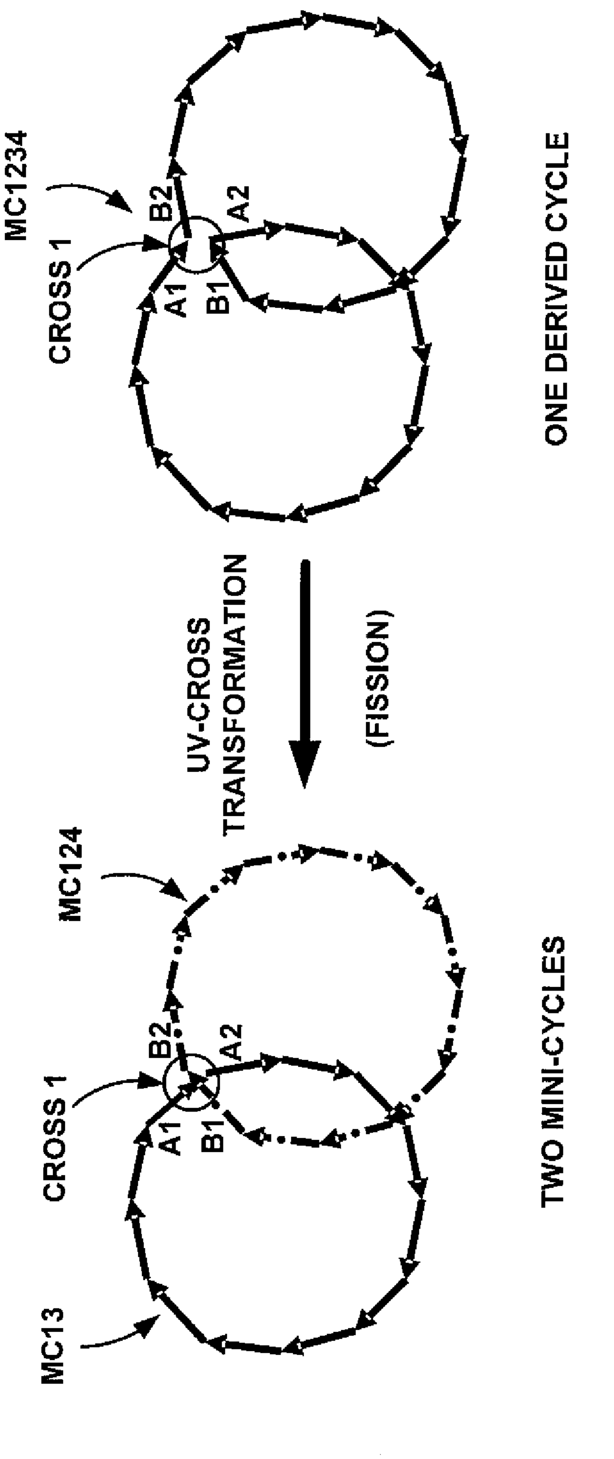
FIG. 4 comprises FIGS. 4A, 4B, 4C, 4D, and illustrates the step of converting mini-cycles and "derived" cycles with assigned UVs into new "derived" cycles, by the optimization framework of FIG. 1, using UV-Cross transformation and UV-k-Swap transformation.

With reference to FIG. 4A, UV-Cross fission transformation implies that one directed derived cycle (e.g., MC1234) crosses itself at a cross point, which is referred to as Cross 1 (right diagram), and which is formed of 4 arrows $A_1$, $A_2$, $B_1$, $B_2$, can produce two mini-cycles by replacing arrows $A_1$→>$B_2$, $B_1$→$A_2$ assignments with $A_1$→$A_2$, $B_1$→$B_2$ assignments, in order to obtain two, smaller mini-cycles MC13 and MC124 (as shown in the left diagram). The UV-Cross transformation is also said to fuze the derived cycles (step 500 of the optimization framework 100).

The UV-Cross transformation step continues iteratively on the larger cycle created after UV-k-Swap, until no more crosses on itself can be found.

A single Cross-transformation can be applied either to two unassigned MCs or to two assigned MCs to the same UV. However, two or more crosses applied simultaneously result in transformation of G called swap. Swap transformation can be applied to two or more UVs. There is restriction, however, that a Swap-transformation cannot apply to MCs simultaneously assigned to UVs of different types, such as UAVs and UGVs. That is, the cycles must be either unassigned or assigned to either UAVs or UGVs, but not to both. It should be noted that the directions of the arrows (or arcs) in G are preserved after the UV-Cross transformation (FIG. 4A).

A UV-k-Swap transformation is obtained through the application of k simultaneous UV-Cross transformations, with k>1. The simplest exemplary swap, UV-2-Swap transformation, is illustrated in FIG. 4B, and involves two crosses that are referred to as Cross 1 and Cross 2.

Figure 4B:
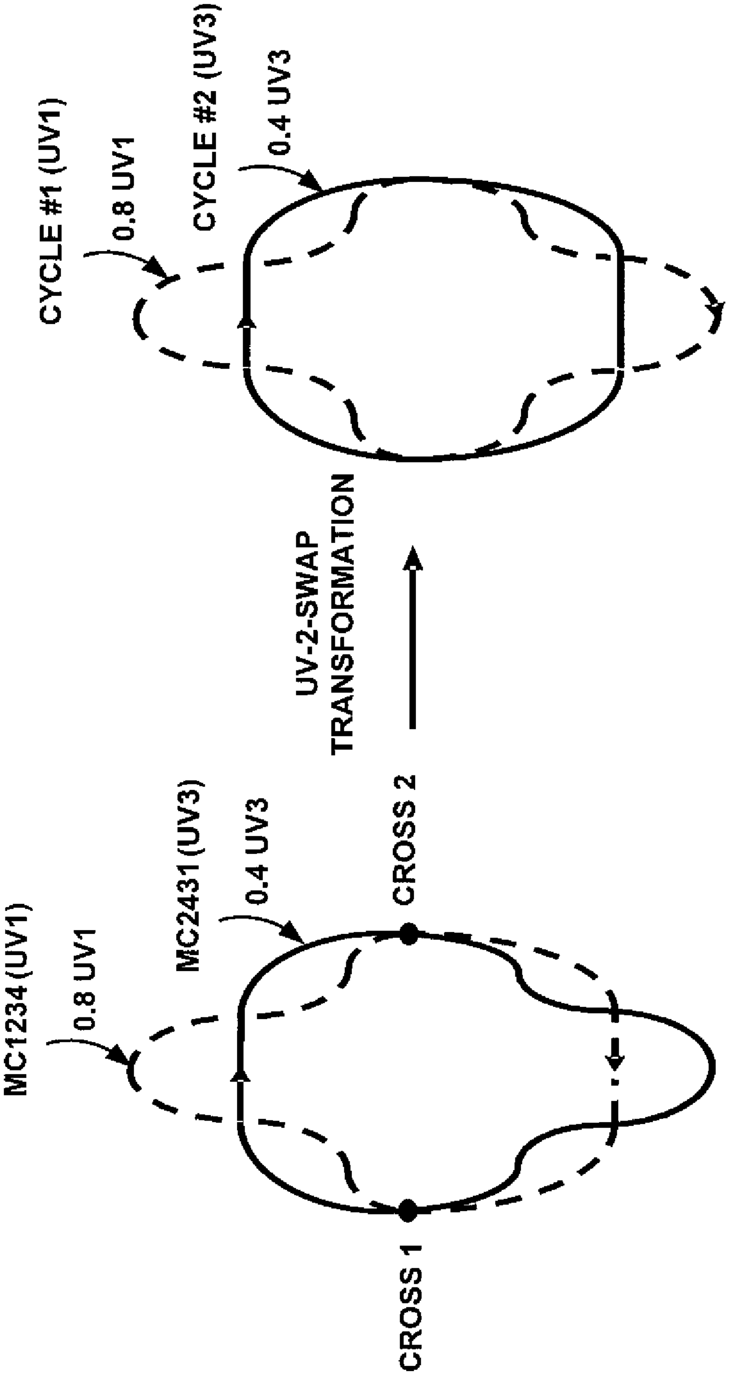

The left diagram of FIG. 4B illustrates two exemplary mini-cycles, MC1234 (in dashed line) and MC2431 (in solid line). These two mini-cycles, MC1234 and MC2431, are assigned for example to two different UVs, such as UV1 and UV3, respectively. These UVs may or may not be of the same kind. However, they have to be both either UAVs or UGVs.

As illustrated in the right diagram, after a UV-2-Swap transformation, the UV assignment distribution might be affected depending on the assignment strategy that has been chosen. In this example, UV1 has been reassigned to cycle#1, which is shown in a solid line, and which is formed in part of MC1234 and in part of MC2431. Similarly, UV3 has been reassigned to cycle#2, which is shown in a solid line, and which is formed of the remaining part of MC1234 and the remaining part of MC2431.

It should be noted that the reassignment of the MCs may or may not affect the assignment of the "weight," which is referred to as a real number (e.g., fractional numbers 0.8 and 0.4 of the corresponding assigned UVs in FIG. 4B). In this example in FIG. 4B, the UV-2-Swap transformation has preserved the assigned weights; 0.8 remains assigned to UV1 and 0.4 remains assigned to UV2.

Figure 4C:
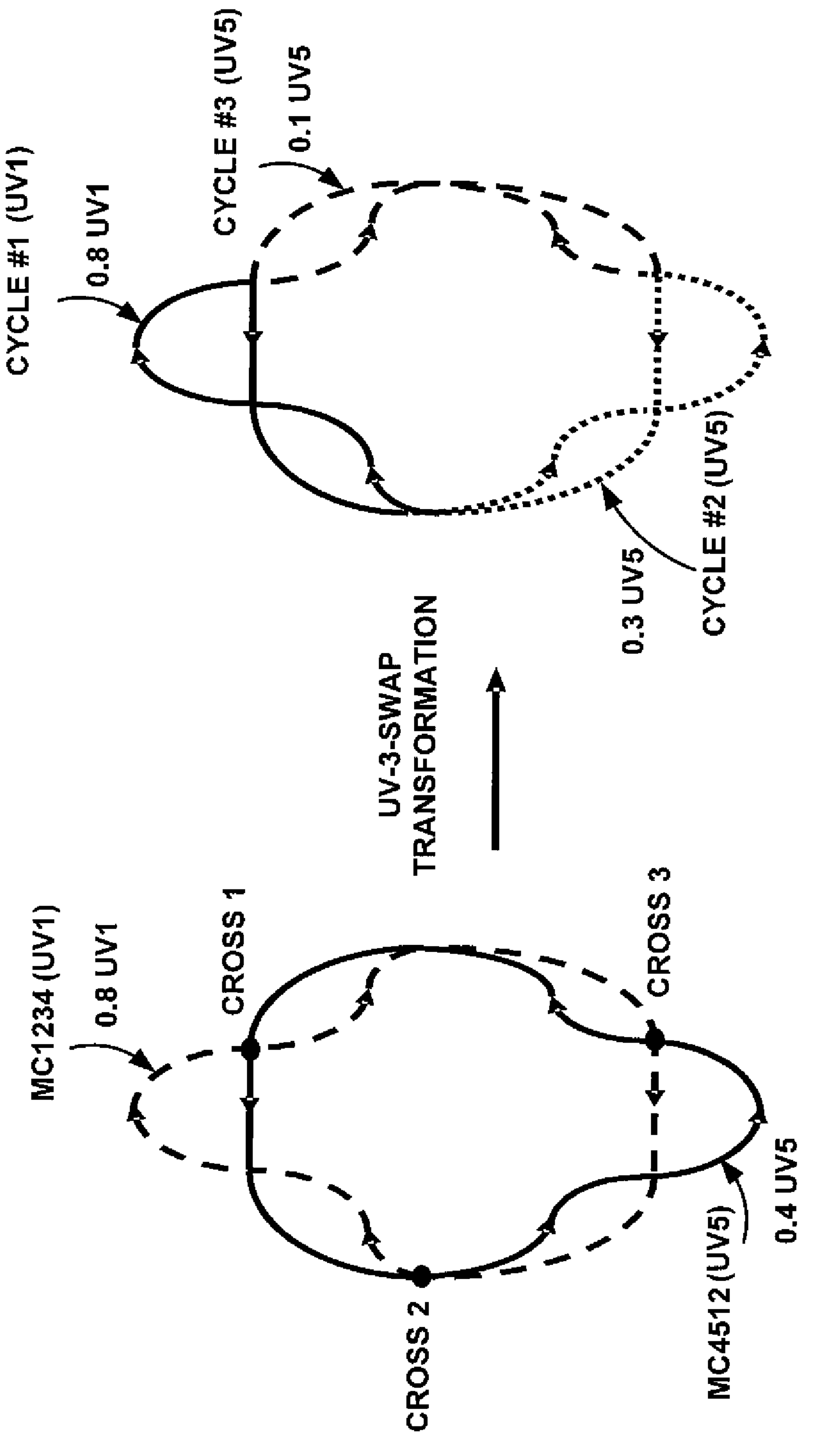

A similar but more complicated UV-3-Swap transformation is illustrated in FIG. 4C. The UV-3-Swap transformation involves three simultaneous crosses of two exemplary mini-cycles, MC1234 and MC4512. These crosses are referred to as Cross 1, Cross 2, and Cross 3. The left diagram of FIG. 4C illustrates two exemplary mini-cycles, MC1234 (in dashed line) and MC4512 (in solid line). These two mini-cycles, MC1234 and MC4512, are assigned for example to two different UVs, such as UV1 and UV5, respectively. These UVs may or may not be of the same kind. However, they have to be both either UAVs or UGVs.

It is important to note that the UV-3-Swap transformation provides a set of derived cycles in G that is not realized by any sequence of UV-2-Swaps/UV-Crosses transformations. After the UV-3-Swap transformation, the UV assignment distribution might be affected depending on the assignment strategy that has been chosen. In particular, the assignment of a single UV, e.g., UV1 corresponding to the MC1234 in the left diagram will be affected. This was not an issue after a UV-2-Swap transformation.

As illustrated in the right diagram, after a UV-3-Swap transformation, UV1 has been reassigned to cycle#1, which is shown in a solid line, and which is formed in part of MC1234 and in part of MC4512. Similarly, UV5 has been reassigned to cycle#2, which is shown in a dotted line, and which is formed in part of MC1234 and in part of MC4512. UV2 has been assigned to cycle#3, which is formed of the remaining parts of MC1234 and MC4512.

The UV-3-Swap transformation has assigned the weight 0.8*UV1 to the derived cycle #1, the weight 0.3*UV5 to the derived cycle #2, and the weight 0.1*UV5 to the derived cycle #3. So, the total of weights before UV-3-Swap was 0.8*UV1 and 0.4*UV5, which equals 0.8*UV1 and (0.3+0.1)*UV5 after UV-3-Swap, which means that the sum of weights has been preserved.

Figure 4D:
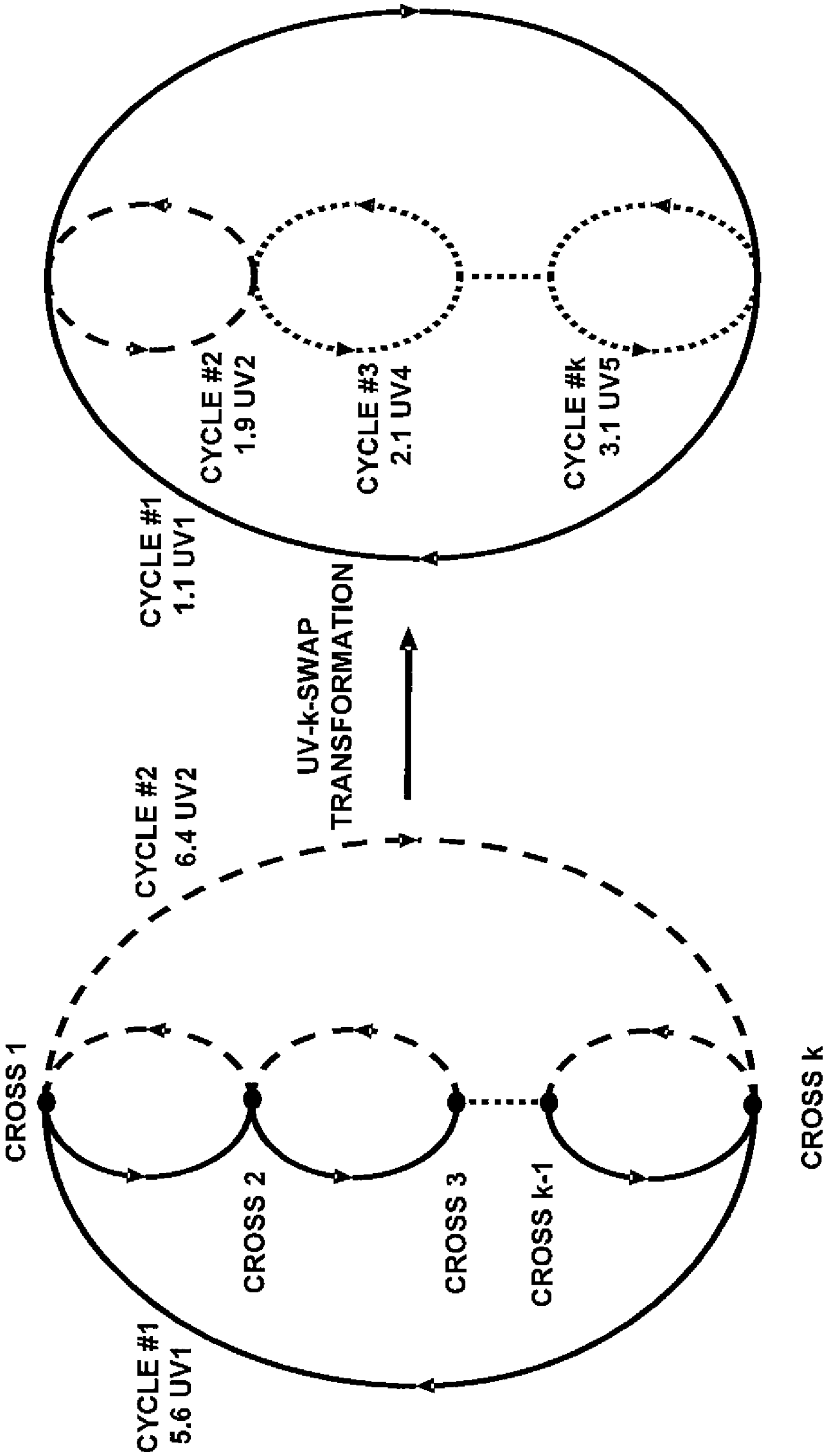

The UV-k-Swap transformation is illustrated in FIG. 4D, and involves k crosses. The left diagram of FIG. 4D illustrates two exemplary mini-cycles, Cycle #1 (shown in a solid line)

and Cycle #2 (shown in a dashed line) that cross each other in k places (or crosses). These crosses are referred to as Cross 1, Cross 2, Cross 3, . . . , Cross k−1, and Cross k. In this illustration Cycle #1 is assigned to UV1 with a weight of 5.6*UV1, while Cycle #2 is assigned to UV2 with a weight of 6.4*UV2.

The UV-k-Swap transformation results in k derived cycles that are illustrated in the right diagram as Cycle #1, Cycle #2, Cycle #3, . . . , and Cycle #k. In this illustration, the derived Cycle #1 is illustrated in a solid line and is reassigned to UV1 with a weight of 1.1*UV1; the derived Cycle #2 is illustrated in a dashed line and is reassigned to UV2 with a weight of 1.9*UV2; the derived Cycle #3 is illustrated in a dotted line and is reassigned to UV4 with a weight of 2.1*UV4; and the derived Cycle #k is also illustrated in a dotted line and is reassigned to UV5 with a weight of 3.1*UV5.

It is important to note that these swaps or transformations may or may not affect the directions of the arcs the cycles. Even though a swap transformation cannot apply to cycles assigned to UAVs and UGVs at the same time, the consideration has to be given for UAVs as well as UGVs when the swaps are considered, in order to minimize the overlap of the given target area of interest.

The UV-k-Swap transformation algorithm takes as input the assigned cycles Cycle #1 (or $C_1$) and Cycle #2 (or $C_2$) from balanced G and integer k. Cycle $C_1$ of length $|C_1|$ is scanned, one node at a time, for possible UV-Cross with cycle $C_2$. When a UV-Cross between cycles $C_1$ and $C_2$ is found then a corresponding node is saved in a candidate node list for UV-Cross, and an internal counter (initialized to 0) is incremented and compared against the given k. If the counter equals k then the UV-k-Swap transformation is executed by performing UV-Cross on cycles $C_1$, $C_2$ at every node from the candidate node list.

The executed UV-k-Swap transformation is considered to be successful if it does not introduce new violations (e.g., flying length violation) and either decreases the number of violations or increases the coverage. Otherwise, the UV-k-Swap transformation is unsuccessful and backtracking based on Depth-First Search is used to find the next candidate node list. The transformation algorithm terminates if either the UV-k-Swap transformation has been successfully executed, or if k nodes have been scanned and $|C_1|-k'<k$-counter.

The UV-k-Swap transformation step continues iteratively, until either all UV-k-Swaps have been exhausted, or the time to find next UV-k-Swap becomes too long.

Figure 6:
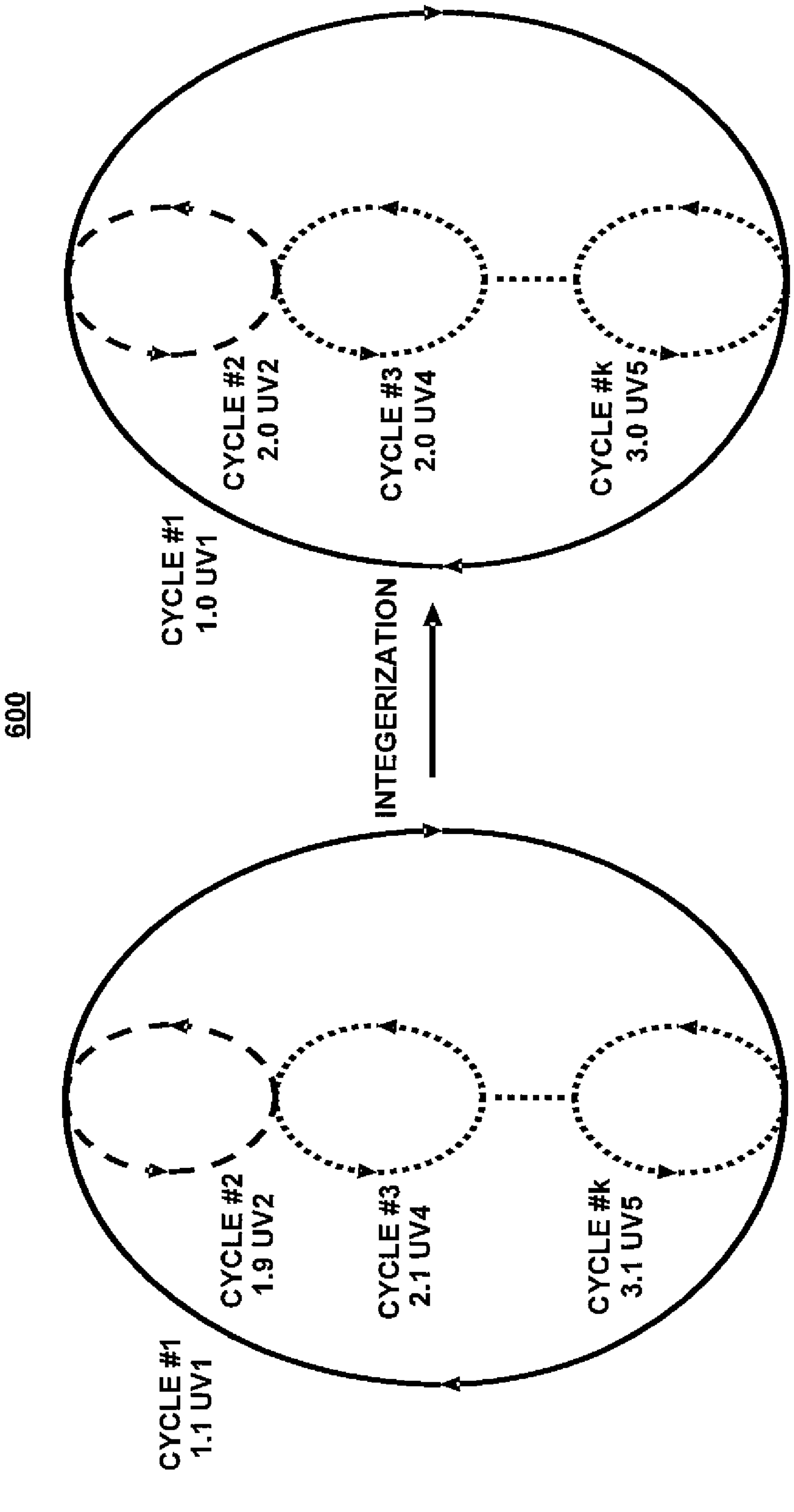
FIG. 6 illustrates the step of integerizing a practical, realistic solution by the optimization framework of FIG. 1.

With reference to step 600 of FIG. 6, the optimization framework 100 integerizes a practical, realistic solution for the fuzed derived cycles (step 500). The optimization framework 100 integerizes the UV assignments of FIG. 4D. In other terms, the optimization framework 100 replaces the real numbered assignments of the UVs to cycles with integral assignments.

In this illustration, the derived Cycle #1 that has been assigned a weight of 1.1*UV1 is reassigned an integer value 1.0*UV1. The derived Cycle #2 that has been assigned a weight of 1.9*UV2 is reassigned an integer value 2.0*UV2. The derived Cycle #3 that has been assigned a weight of 2.1*UV4 is reassigned an integer value 2.0*UV4. The derived Cycle #k that has been assigned a weight of 3.1*UV5 is reassigned an integer value 3.0*UV5.

As explained earlier, at step 700, the optimization framework 100 synchronizes the schedule of the UVs that are assigned to the fuzed derived cycles (FIG. 6) in order to maximize the coverage of the target area of interest.

Having explained the general steps of the optimization framework 100, the following description will provide additional supporting details.

UVs require frequent recharging/refueling, which means that the scheduling of periodic maintenance plays an important role in the optimization framework 100 of the present invention. It is assumed that the maintenance sites are a priori given along with the UVs, skeleton, and the distance matrix. Consequently, some cycles will have a maintenance node and some cycles will not. If a cycle contains at least one maintenance node then it is referred to as an “m-cycle;” otherwise, it is referred to as an “nm-cycle.”

Figure 5:
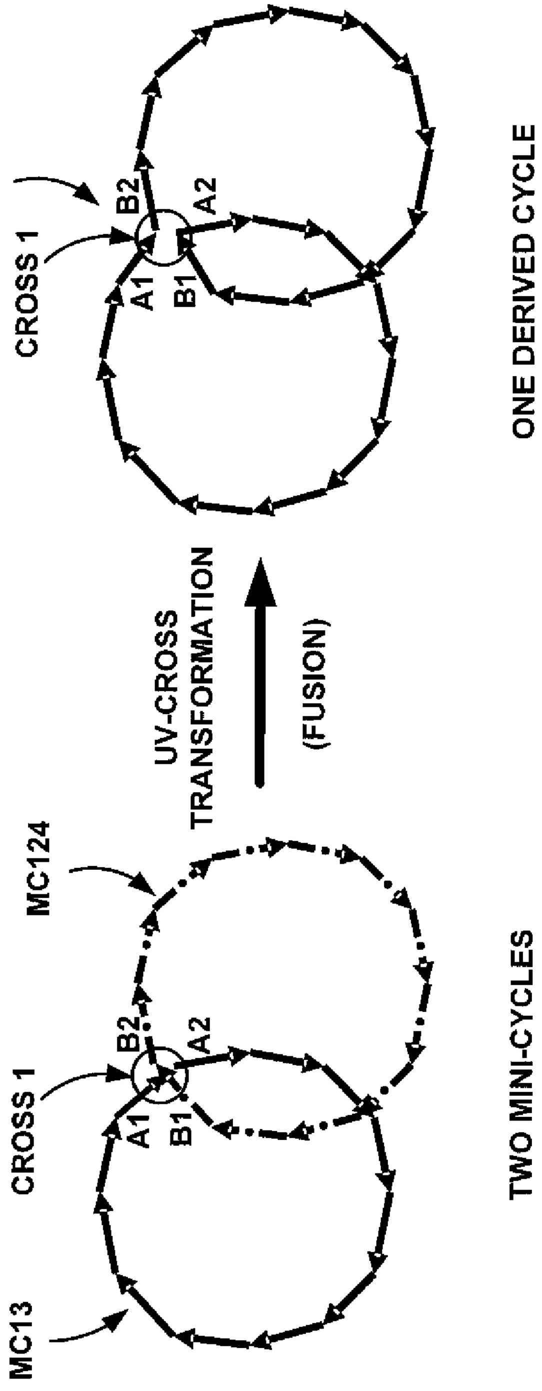
FIG. 5 illustrates the step of fusing mini-cycles and derived cycles by the optimization framework of FIG. 1, by executing a series of UV-Crosses performed on two crossing cycles at a time.

One goal of the optimization framework 100 is to eliminate (or at least substantially reduce) the nm-cycles that will remain assigned to a UV in the proposed solution of FIG. 5. FIG. 4B illustrates that a cross transformation can eliminate an nm-cycle as shown in the following example of optimization with a UV-2-Swap transformation.

The purpose of the optimization engine that is based on UV-Cross and UV-k-Swap transformations is to maximize the coverage of the given area of interest by the given UVs that are currently assigned to the mini-cycles. FIG. 4B illustrates the increase of the coverage based on a UV-2-Swap transformations for two UVs assigned to two mini-cycles. It is assumed that the lengths from CROSS 1 to CROSS 2 on the left side (i.e., before UV-2-Swap) for solid and dashed cycles are 2 and 1 respectively, and the lengths from CROSS 2 to CROSS 1 on the left side (i.e., before UV-2-Swap) for solid and dashed cycles are 3 and 5 respectively. The fractional weights correspond to a fraction of the UV that is currently assigned to a given cycle in G. As a result, the initial coverage (shown in the left diagram) is 2*0.8+3*0.8+1*0.4+5*0.4=6.4. After UV-2-Swap transformation of G coverage increases to 2*0.8+5*0.8+1*0.4+3*0.4=7.2, which gives improved partial result. The result obtained in FIG. 4B would favor to retain a cycle that covers 7*0.8=5.6 (i.e., solid lines after UV-2-Swap). That consideration will take place during the integerization at the fifth step of the optimization framework.

The formulation of the optimization problem will now be described. Let $S_0^h$ be a set of initially assigned mini-cycles in G, and Ω is a collection of all such sets (i.e. $s_0^h \in \Omega$, $0 \le h < |\Omega|$). Let $S_i$, $i>0$, be attainable set of assigned derived cycles from a given $S_0^h$ after ordered execution of i UV-k-Swap transformations, where each UV-k-Swap is followed by one or more UV-Cross transformation(s) on affected cycles.

The initial assignment problem can be formulated as follows. For given n types of UVs let integers $m_1, m_1, \ldots m_n$ represent the given numbers of UVs of given type respectively. So, $m_j$ represents a number of UVs of type j, $j \le n$. Let $C_1, C_2 \ldots C_k$ be given unassigned mini-cycles of a total length L in G, and let $f(C_i)$ be a given length of $C_i$. Let $Q_j^i(G)$ be a combination of t(i,j) mini-cycles $C_{j(1)}{}^i, C_{j(2)}{}^i, \ldots, C_{j(t(i,j))}{}^i$ in assignment i (i.e., $s_0^i \in \Omega$) of G assigned to UVs of type j, $j \le n$. Then:

$$\max_{s_0^i \in \Omega} \sum_{j=1}^{n} \sum_{q=1}^{t(i,j)} r^i_{j(q)} f(C^i_{j(q)}) \text{ for } 0 \le i < |\Omega| \tag{1}$$

Subject to:

$$Q_j^i(G) \cap Q_k^i(G) = 0 \text{ for } j \ne k, \tag{2}$$

$$r^i_{j(q)} = \frac{m_j}{\sum_{p=1}^{t(i,j)} f(C^i_{j(p)})} f(C^i_{j(q)}) \text{ for } t(i, j) \geq q \geq 1, n \geq j \geq 1, \tag{3}$$

$$\sum_{p=1}^{t(i,j)} r^i_{j(p)} = m_j \text{ for } n \geq j \geq 1, \tag{4}$$

$$\sum_{j=1}^{|S_0|} f(C^i_j) = L. \tag{5}$$

During the optimization based on UV-Cross and UV-k-Swap transformations the objective (1) remains the same, and constraints (2), (4), (5) are enforced. Constraints (2) and (5) are automatically preserved. To preserve constraint (4) during our optimization based on UV-Cross and UV-k-Swap transformations an appropriate reassignment of $r_j$s has to be done as follows. If two cycles are created from one cycle (i.e., cycle fission) based on UV-Cross then the redistribution according to $f(C_i)$ has to be performed. If one cycle is created from two cycles (i.e., cycle fusion) based on UV-Cross then reassigned $r_j$ equals sum of $r_j$s assigned to original two cycles. The reassignment also has to be performed after UV-k-Swap for k≥3 (for k=2 our assignment remains unchanged).

The optimization problem based on a given initial assignment $S_0^h$ can be now formulated. Let $Q_j^i(G)$ be a combination of t(i,j) mini-cycles $C_{j(1)}^i, C_{j(2)}^i, \ldots, C_{j(t,(i,j))}^i$ in assignment $S_i$ (i>0) of G assigned to UVs of type j, j≤n. Then:

$$\max_{S_i} \sum_{j=1}^{n} \sum_{q=1}^{t(i,j)} r^i_{j(q)} f(C^i_{j(q)}) \text{ for } i \geq 1 \tag{6}$$

Subject to:

$$Q_j^i(G) \cap Q_k^i(G) = 0 \text{ for } j \neq k, \tag{7}$$

$$\sum_{p=1}^{t(i,j)} r^i_{j(p)} = m_j \text{ for } n \geq j \geq 1, \tag{8}$$

$$\sum_{j=1}^{|S_0|} f(C^i_j) = L. \tag{9}$$

The optimization is focused on objective function (6) and it is based on UV-Cross and UV-k-Swap transformations preserving constraints (7-9). If is at the core of optimization framework 100 described herein.

The optimization framework 100 assumes that UVs are given, balanced multidigraph G, distance matrix D corresponding to G, and maintenance vertices in G. By having UVs it is possible to also obtain attributes associated with each individual UAV or UGV such as maximum speed, time to refuel, payload, etc.

At step 200 of FIG. 1, the optimization framework 100 generates the mini-cycles by applying standard shortest path algorithm (e.g., Dijkstra, Bellman-Ford, Suurballe algorithm, etc.) to G iteratively. That is, in the current cycle-generation iteration G is taken into consideration G and excludes the mini-cycles that already have been generated, such as by using a greedy approach.

At step 300 of FIG. 1, the optimization framework 100 assigns UVs to the mini-cycles. Since the number of mini-cycles should greatly exceed the number of given UVs (based on the scenarios from the US airline industry) for a typical anticipated scenario, then a given UV will be assigned to k>>1 cycles. An important constraint is that each cycle must be assigned by exactly one type of UV. All k cycles would have to satisfy a loitering restrictions implied by given UV. For example, a cycle cannot contain $d_i \in D$ that exceeds the refueling requirement of our UV. There are number of strategies that we can take in order to determine what fraction of our UV is assigned to a particular cycle.

Let $C_{i_1}, C_{i_2}, \ldots, C_{i_k}$ be k cycles assigned to m UVs of the same type, where k>m. A simple approach would be to assign m/k to each cycle, but it would violate the interest of community. So our approach is based the community of interest. Let $f(C_i)$ be a length of $C_i$. Then to every cycle $C_{i_j}$ there is assigned number r∈R that satisfies:

$$r = \frac{m}{\sum_{q=1}^{k} f(C_{i_q})} f(C_{i_j}).$$

So, initially UVs of the same type are assigned to k mini-cycles in such a way that the same portion r of our UVs is assigned per given unit of distance at each assigned mini-cycle. This means that $r_{i_j} \geq r_{i_2} \geq \ldots \geq r_{i_k}$ if the cycles are partially ordered $f(C_{i_1}) \geq f(C_{i_2}) \geq \ldots \geq f(C_{i_k})$.

At step 400 of FIG. 1, the optimization framework 100 represents a core of multi-objective optimization that is based on the UV-k-Swap and UV-Cross transformations. The main component of step 400 is a basic iteration, which includes UV-k-Swap transformation followed by one or more UV-Cross transformations. Both types of transformations preserve the existence of all cycles for persistent loitering. Each UV-Cross is applied to one affected cycle at a time causing splitting of such a cycle into two cycles. So, a basic iteration consists of UV-k-Swap followed by fission of the affected cycles. Such fission of cycles is accomplished by scanning recursively each affected cycle after UV-k-Swap and applying UV-Cross transformation to one affected cycle at a time (if that is possible).

The underlying rules are as follows. First, the total number of violations (e.g., maintenance violation, flight violation) should not increase after a basic iteration. Second, the coverage can decrease only if the number of violations decreases. Otherwise, the coverage must increase. Initially, before the execution of step 400, all the cycles are mini-cycles. As the optimization progresses through basic iterations some of these mini-cycles are converted into derived cycles that serve as a basis for subsequent optimization.

During the optimization an appropriate balance between the numbers of cycles versus the sizes of the cycles should be maintained. If we have initially all mini-cycles in G then the likelihood of violating the loitering rules based on UV-k-Swap is minimum. The violation probability increases for a UV-k-Swap if the involved cycles become larger. For example, such a violation can happen if one long cycle is assigned to a long-lasting UV (i.e., UV that does not require frequent maintenance), and another short cycle is assigned to a short-lasting UV. A swap applied in this case could likely violate the maintenance requirement for a short-lasting UV.

As a result, maintaining as short cycles as possible by automatically applying UV-Crosses and splitting the affected cycles after each UV-k-Swap during the optimization increases probability that the number of maintenance violations will not increase after a basic iteration. Maintaining the shortest cycles during the optimization, however, might miss some UV-k-Swaps that would otherwise be feasible. One way of coping with this issue is through the controlled/smart use of the UV-Cross transformations (i.e., controlled cycle fission). Another way is through combining steps 500 and 600 in an efficient way.

Step 500 of FIG. 1 can be performed once the optimization based on the basic iterations is completed, and the resulting cycles in G are ready to be fused. The fusion of cycles will rely on the UV-Cross applied to two crossing cycles being assigned to the same UV type at a time. Once the cycles are fused the assignment of corresponding UV has to be adjusted.

It should be noted that the fusion of cycles can reduce the number of maintenance violations (from 1 to 0 in FIG. 5). That is, cycles MC13 without maintenance violation and MC124 with maintenance violation are fused together creating cycle MC1234 without maintenance violation.

Step 600 of FIG. 1 illustrates the integerization of the UV assignments by replacing the real numbered assignments of UVs to cycles with integral assignments. For the given m UVs of the same type i and their corresponding assignment distribution $r_{i_1}, r_{i_2}, \ldots, r_{i_k}$ among k derived cycles, integerization is feasible because after Step 600 $r_{i_1}+r_{i_2}+\ldots+r_{i_k}=m$ is satisfied. If all cycles are m-cycles then integerization in Step 600 ideally should resolve the remaining violation issues. So, integerization reassigns UVs to m-cycle originally assigned to 2.3 UV and to m-cycle originally assigned to 0.6 UV.

If some cycles remain as nm-cycles, however, then such cycles become unassigned after step 600, which is quite a realistic scenario. It should be noted that the reassignment of UVs to a dashed cycle is preferable over reassignment to a dotted cycle, but such reassignment would violate a maintenance requirement. In addition, step 600 also considers the relative coverage of the UAVs relative to the UGVs. That is, an appropriate lower weight is given to the cycles assigned (but not yet integerized) to UAVs (or UGVs) if there is an overlap with an integerized cycle assigned to UGV (or UAV).

At step 700 of FIG. 1, the scheduling of maintenance times will allow an assignment of the loitering pattern of each UV to a specific time interval in the general loitering schedule. This scheduling will be focused on the maximization of the coverage of the given area of interest based on additional features of UVs such as speed, sensor coverage range, cycle overlap, etc. In particular, two or more UVs assigned to a single m-cycle after completion of step 600 will be separated by the fixed distance or time interval (e.g., 2 UVs assigned to dotted line cycles in FIG. 4D).

The embodiments described herein are included for the purposes of illustration, and are not intended to be the exclusive; rather, they can be modified within the scope of the invention. Other modifications can be made when implementing the invention for particular applications, whether military of commercial.

What is claimed is:

1. An optimization process for persistent surveillance of a target coverage area, using a plurality of unmanned vehicles, the optimization process comprising:

identifying a skeleton, wherein said skeleton is a directed balanced graph, which skeleton includes a plurality of nodes, where each of said plurality of nodes corresponds to a waypoint, wherein the plurality of nodes are interconnected by a plurality of links, wherein each of said plurality of links is a directed leg; wherein the skeleton characterizes the loitering pattern of the unmanned vehicles;

wherein each link has two ends, wherein a one end is an input to a node, and a second end is an output from a node;

wherein any of the plurality of nodes has, connected to it, a number of inputs to the node which are equal to a number of outputs from the node;

generating a plurality of mini-cycles that, individually, selectively cover at least some of the links and at least some of the nodes for the target coverage area, and which mini-cycles, in aggregate, cover all of the links, and all of the nodes for the target coverage area, using the skeleton;

assigning the plurality of unmanned vehicles to the generated mini-cycles;

iteratively transforming the generated mini-cycles into an derived cycles, and transforming said derived cycles into new said derived cycles, with assigned unmanned vehicles, by using UV-Cross transformation to split said mini cycles or said derived cycles, to obtain two smaller derived cycles, and also by using UV-k-Swap transformation;

wherein said UV-Cross transformation includes the following steps:

wherein link ends which are connected to a cross point node comprise inputs to a node A1 and A2, and outputs from a node B1 and B2;

wherein, where A1 had been assigned B2, B1 had been assigned to A2;

transforming the assignments so that A1 is now assigned to A2, and B1 is now assigned to B2;

wherein said UV-k-Swap transformation includes the following steps:

wherein a at least two mini cycles or derived cycles cross at at least two nodes;

simultaneously using a UV-Cross transformation on each of the nodes such that said the at least two mini cycles or derived cycles exchange at least one link;

fusing the derived cycles, using UV-Cross transformations, such that the derived cycles are fused into an fuzed derived cycles, with weights distributed to the assigned unmanned vehicles;

wherein the fusing of derived cycles preserves the sum of the distributed weights;

integerizing the distributed weights;

wherein integerizing the distributed weights preserves the sum of the distributed weights;

whereby said integerizing the distributed weights includes the following steps:

wherein m is an integer which represents a given number of unmanned vehicles;

wherein k is the number of fuzed derived cycles;

wherein ri1, ri2, . . . rik are real numbers, corresponding to said distributed weights, assigned respectively, to said k fuzed derived cycles;

wherein before integerization, ri1+ri2+ . . . +rik=m;

replacing said ri1, ri2, . . . , rik real number distributed weights with an integral assignments which correspond to an rounded integer values, but where rounding is modified so that, after rounding, the condition ri1+ri2+ . . . +rik=m remains true, and;

synchronizing the loitering schedule of the plurality of unmanned vehicles to maximize the surveillance of the target coverage area.

2. The optimization process according to claim 1, wherein the plurality of unmanned vehicles include unmanned aerial vehicles.

3. The optimization process according to claim 1, wherein the plurality of unmanned vehicles include unmanned ground vehicles.

4. The optimization process according to claim 1, wherein the plurality of unmanned vehicles include a combination of unmanned aerial vehicles and unmanned ground vehicles.

5. The optimization process according to claim 1, wherein the persistent surveillance includes an aerial loitering pattern.

6. The optimization process according to claim 1, wherein the persistent surveillance includes a ground loitering pattern.

7. The optimization process according to claim 1, wherein the plurality of mini-cycles include cycles with shortest links.

8. The optimization process according to claim 1, wherein assigning the plurality of unmanned vehicles to the generated mini-cycles includes assigning unmanned vehicles of the same type.

9. The optimization process according to claim 1, wherein using the UV-k-Swap transformation includes iteratively continuing the UV-k-Swap transformation until UV-k-Swaps have been exhausted.

10. The optimization process according to claim 1, wherein using the UV-k-Swap transformation includes iteratively continuing the UV-k-Swap transformation until a determination is made that the UV-k-Swap transformation has exceeded a predetermined length threshold.

11. The optimization process according to claim 1, wherein using the UV-Cross transformation includes iteratively continuing the UV-Cross transformation until all crosses are exhausted.

* * * * *